US008818551B2

(12) United States Patent
Marrese et al.

(10) Patent No.: US 8,818,551 B2
(45) Date of Patent: Aug. 26, 2014

(54) METHOD AND SYSTEM FOR AUTOMATICALLY TRACKING PACKAGES IN AUTOMATED PACKAGING SYSTEM

(71) Applicant: Vistaprint Schweiz GmbH, Winterthur (CH)

(72) Inventors: Justin D. Marrese, Cambridge, MA (US); Marco A. Lara, Topsfield, MA (US); Boris I. Paskalev, Winterthur (CH)

(73) Assignee: Vistaprint Schweiz GmbH, Winterthur (CH)

( * ) Notice: Subject to any disclaimer, the term of this patent is extended or adjusted under 35 U.S.C. 154(b) by 0 days.

(21) Appl. No.: 14/058,787

(22) Filed: Oct. 21, 2013

(65) Prior Publication Data

US 2014/0046479 A1 Feb. 13, 2014

Related U.S. Application Data

(62) Division of application No. 12/689,161, filed on Jan. 18, 2010, now Pat. No. 8,565,914.

(51) Int. Cl.
*G06F 7/00* (2006.01)
*G06Q 10/08* (2012.01)

(52) U.S. Cl.
CPC .............. *G06Q 10/087* (2013.01); *G06Q 10/08* (2013.01); *G06Q 10/0833* (2013.01)
USPC ....................................... 700/223

(58) Field of Classification Search
USPC ........................... 700/229, 213, 223
See application file for complete search history.

(56) References Cited

U.S. PATENT DOCUMENTS

| | | | |
|---|---|---|---|
| 4,622,875 A | 11/1986 | Emery et al. | |
| 7,904,192 B2 | 3/2011 | Chua et al. | |
| 8,565,914 B2 | 10/2013 | Marrese et al. | |
| 2002/0026768 A1 | 3/2002 | Duncan et al. | |
| 2004/0162638 A1 | 8/2004 | Solomon | |
| 2005/0251291 A1 | 11/2005 | Solomon | |
| 2006/0178774 A1 | 8/2006 | Reznik | |
| 2007/0129957 A1 | 6/2007 | Elliott et al. | |
| 2008/0199297 A1 | 8/2008 | Grunbach et al. | |

OTHER PUBLICATIONS

European Patent Office, "Supplementary European Search Report," issued on Nov. 6, 2013 for EP Application No. 11700775.
International Search Report issued on May 25, 2011 for International Application No. PCT/US2011/020791.
Written Opinion of the International Searching Authority, mailed on May 25, 2011 for International Application No. PCT/US2011/020791.
International Preliminary Report on Patentability, issued on Jul. 24, 2012 for International Application No. PCT/US2011/020791.

*Primary Examiner* — Ramya Burgess
(74) *Attorney, Agent, or Firm* — Jessica Costa

(57) ABSTRACT

Methods and systems for tracking product groups associated with orders through an automated packaging system are presented.

4 Claims, 8 Drawing Sheets

202 — Gang / Sequence:     1: A, 2: B, 3: C, 4: D, 5:E

Input:     A ⟹ B ⟹ C ⟹ D ⟹ E

Received Position IDs:    1    2    3    4    5
                          ⇓    ⇓    ⇓    ⇓    ⇓

PID-to-Product Group:    A    B    C    D    E

202 — Gang / Sequence:     1: A, 2: B, 3: C, 4: D, 5:E

Input:     A ⟹ B ⟹ C ⟹ D ⟹ E

Received Position IDs:    1    2    X    Y    5
                                    ⇓    ⇓
Inference:                                3    4
                              ⇓    ⇓    ⇓    ⇓    ⇓

PID-to-Product Group:    A    B    C    D    E

X, Y = Package Present but missing PID

202 — Gang / Sequence:     1: A, 2: B, 3: C, 4: D, 5:E

Input:     A ⟹ B ⟹ C ⟹ D ⟹ E

Received Position IDs:    1    2    -    -    5
                                    ⇓    ⇓
Inference:                                3    4
                              ⇓    ⇓    ⇓    ⇓    ⇓

PID-to-Product Group:    A    B    C    D    E

- = Package missing

202 — Gang / Sequence:     1: A, 2: B, 3: C, 4: D, 5:E

Input:     A ⟹ B ⟹ C ⟹ D ⟹ E

Received Position IDs:    1    2    X or -    X or -    5
                                        ⇓       ⇓
Inference:                                3 or 4   3 or 4
                          ⇓    ⇓      ⇓       ⇓      ⇓

PID-to-Product Group:    A    B    3 or 4   3 or 4    E

Eject for operator review

*FIG. 2D*

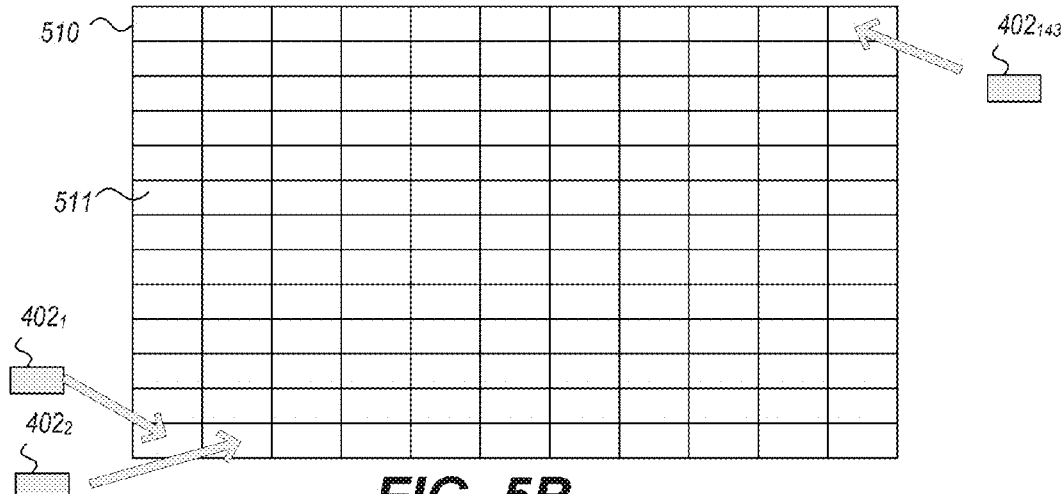

METHOD AND SYSTEM FOR AUTOMATICALLY TRACKING PACKAGES IN AUTOMATED PACKAGING SYSTEM

CROSS-REFERENCE TO RELATED APPLICATION

This application is a divisional of U.S. application Ser. No. 12/689,161, filed on Jan. 18, 2010, now U.S. Pat. No. 8,565,914, which is hereby incorporated by reference in its entirety.

BACKGROUND

Manufacturing plants make products that are typically packaged, often in boxes. In large-scale operations, automated packaging systems may replace human labor to automatically place products into packages.

In a typical manufacturing plant, large volumes of identical products are typically manufactured in an assembly line process, and submitted, in large volumes to an automated packaging system for packaging. Because the products are identical, individual products conveyed through the automated packaging system need not be specifically tracked. If one or more of the products submitted to the automated packaging system does not ultimately exit the automated packaging system, the impact to the fulfillment of orders for that product can be easily minimized simply by manufacturing and packaging a few extra of the products. While this approach runs the risk of manufacturing a few extra products that have not yet been ordered, the impact to the fulfillment of existing orders is typically low, since no time or operator effort need be consumed in tracking down missing products. That is, if a product entering the automated packaging system does not exit the automated packaging system for any reason, since the product is not unique, the order can be fulfilled by grabbing the next (filled) package out of the automated packaging system.

In contrast, if a manufacturing plant must fill customized orders (i.e., orders that specify different product(s) from one order to the next), then the specific product(s) associated with each order must be tracked between input and output of the automated packaging system so that each package exiting the automated packaging system may be identified as being associated with its respective order. For example, in a manufacturing plant that manufacturers business cards in stacks to be boxed and shipped to different individual customers who ordered the business cards (wherein presumably the content imprinted on the business cards of each stack is different), each box coming out of the automated boxing system may have different contents from each other box and must be matched up with its order so that it can be shipped to the correct address. If, for whatever reason, fewer boxes of business cards come out of the automated boxing system than number of business card stacks submitted to the automated boxing system, the operator must track down which customized business card stack is missing. This can cause significant delay and can hold up the shipping of the entire run of orders.

Accordingly, it would be desirable to have techniques for automatically tracking and matching up packages conveyed through an automated packaging system with the specific order to which they belong.

SUMMARY OF THE INVENTION

The present invention is directed at techniques for automatically tracking packages and products through an automated packaging system.

In an embodiment, a method associates packages in an automated packaging system with corresponding product groups conveyed through the automated packaging system, wherein each product group is associated with corresponding one or more products and associated with an order for the corresponding one or more products. The method includes associating a plurality of product groups with a gang, the gang having a plurality of positions organized according to a predefined ordered succession, each position associated with a unique position identifier; assigning each of the plurality of product groups to a different position in the gang; placing respective physical position identifiers corresponding to respective unique position identifiers identifying respective positions in the gang with at least a plurality of respective product groups to be packaged by the automated packaging system; sequencing the plurality of respective product groups along with their respective accompanying physical position identifier into the automated packaging system in order of succession as defined by their associated gang; attempting to identify the position identifier of each respective product group based on the physical position identifier accompanying the respective product group and/or the physical position identifier accompanying one or more of the other product groups conveyed through the automated packaging system; and wherein if the position identifiers associated with all product groups conveyed through the automated packaging system are identified, identifying the corresponding product group based on its corresponding position identifier, identifying the order associated with the identified product group, packaging the product group into a package, and associating the package with the identified order; and wherein if one or more position identifiers are not identified, automatically ejecting the unidentified product group from the automated packaging system for human inspection.

In another embodiment, a method of inferring an identifier of an unidentified product group conveyed through an automated packaging system includes accessing a sequence associated with the product group, the sequence defining an ordered succession of position identifiers; receiving position identifiers associated with identified product groups that are associated with the same sequence and are conveyed through the automated packaging system; and based on the sequence and received identifiers and the position of the product group conveyed through the system relative to the positions of the identified product groups, inferring a position identifier and associating the inferred position identifier with the unidentified product group.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIGS. 2A-2D diagram various product group tracking scenarios.

FIGS. 5A-5C respectively illustrates an example embodiment of a gang template, a content gang file, and an identifier gang file.

DETAILED DESCRIPTION

Systems and methods for tracking product groups through an automated packaging system for associating with corresponding orders are presented herein.

Figure 1:
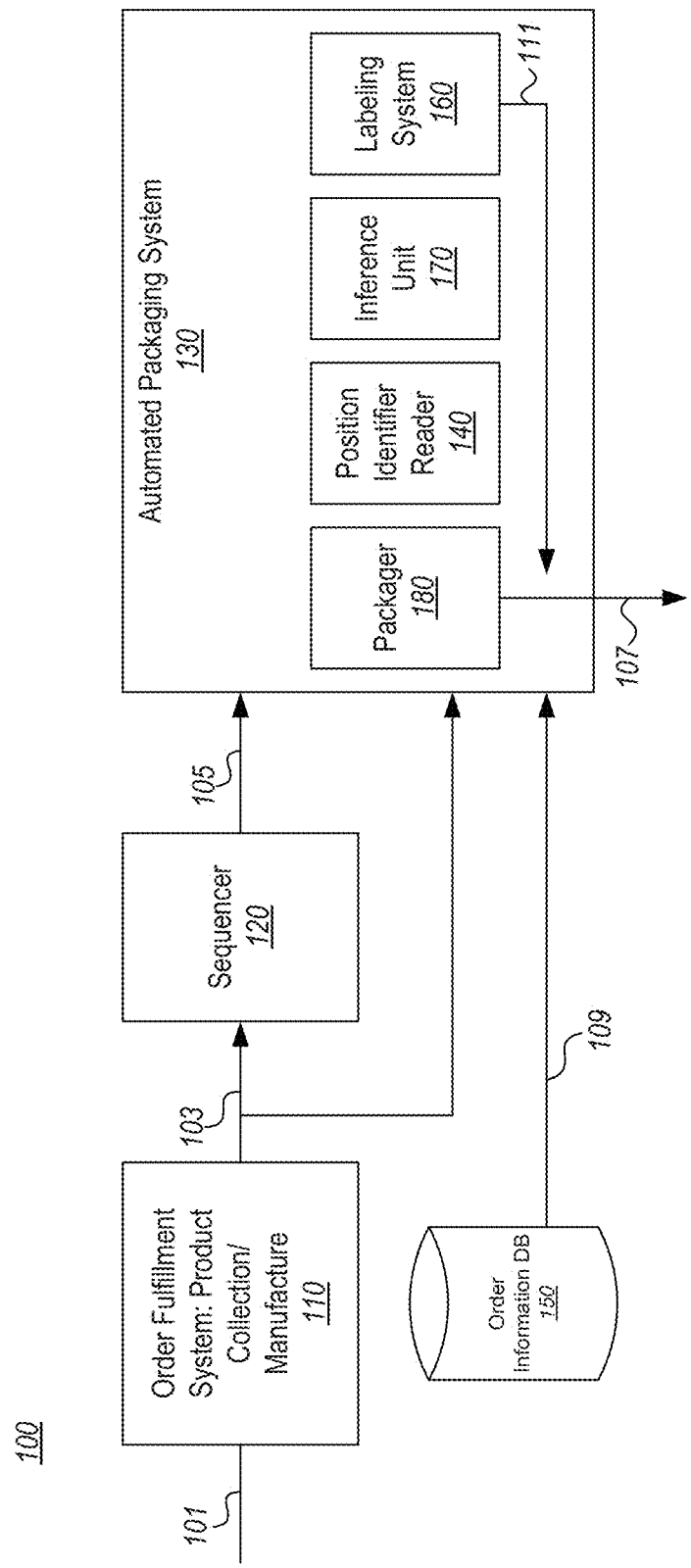
FIG. 1 is a high-level block diagram illustrating an exemplary order fulfillment and packaging system.

Referring to FIG. 1, in general, an order fulfillment system 110 receives a plurality of orders. Each order specifies one or more products requested by a customer or other requesting entity. The order fulfillment system 110 collects or manufactures the products specified in the order. A group of one or more products to be packaged together in a single package is herein referred to as a "product group" 103. An order 101 may be associated with one or more product groups 103.

Upon collection or manufacture of the products in a product group 103, that product group 103, along with a plurality of other product groups 103 (which may be associated with the same order or with different orders 101) are then to be submitted to an automated packaging system 130 to be automatically packaged. The automated packaging system separately packages each product group 103 into a respective package 107 (for example, a box, a plastic container, a crate, a bale, or other physical grouping means).

Because the automated packaging system 130 is automated and each order may specify different products, the contents of each product group may be different from any other product group received by the automated packaging system 130. Accordingly, a tracking mechanism is required to match up packages coming out of the automated packaging system to their respective orders. The tracking mechanism is used to ensure that all received orders get fulfilled or otherwise processed by the fulfillment system and automated packaging system, and further allows recovery of unidentified packages 107 output by the automated packaging system 130, and/or automated re-submission of orders/product groups when no package 107 matching up to the order/product group is found.

In an embodiment, the tracking mechanism operates to group a plurality of product groups 103 ready for packaging into an ordered succession (hereinafter referred to as a "sequence" 105). A sequence 105 may be identified and distinguished from other sequences by way of a sequence identifier associated with the sequence. A position identifier identifies a position in a sequence and may be associated with a product group in order to link the product group to a particular position in a sequence. For example, referring to FIG. 2A, product groups A, B, C, D, and E are formed and collected, and sequenced into a sequence 202, wherein order A is to be packaged first, then B, followed by C, then D, and finally E, in sequence. The ready-to-package product groups A, B, C, D, E are then introduced into and conveyed through the automated packaging system 130 (FIG. 1) in sequence. Each product group A, B, C, D, E, is accompanied by a different respective position identifier (1, 2, 3, 4, 5). For each respective product group A, B, C, D, E, its associated position identifier 1, 2, 3, 4, 5 may be affixed to one or more of the products belonging to the product group 103, or alternatively, may be a tag, a sheet of paper, or other object having the position identifier visible thereon or discernable therefrom which accompanies the group of product(s) associated with the product group 103. For example, in one specific embodiment, the product groups A, B, C, D, E are stacks of printed documents, and each stack has a top sheet imprinted with a different position identifier. In an alternative embodiment, the product groups A, B, C, D, E, are groupings of one or more products a-g, and each product group is conveyed together with an RFID tag programmed with a different position identifier. (The RFID tags may be reused for the processing of different sequences).

As just discussed, the product groups A, B, C, D, E, are conveyed through the automated packaging system 130 in sequence, each product group A, B, C, D, E getting packaged by the system in order according to its associated position in its associated sequence 202. After packaging, the packages 107 are then conveyed past a scanner or other position identifier recognition means 140, which attempts to read, detect, or otherwise receive, the position identifier accompanying each package as it passes by the reader 140. A label 111 to be associated with the package 107 may then be made by a labeling system 160 based on information associated with the order associated with the product group A, B, C, D, E associated with the position identifier 1, 2, 3, 4, 5. Information 109 associated with the order may be stored in a database 150, and may include, for example only and not limitation, a shipping address and/or customer information. The label 111 may be affixed directly to the package 107, or may be attached to, or otherwise associated with, the package 107 at a later point in the system. For example, the package 107 may be direct shipped, in which case the label 111 may be directly attached to the package 107. Alternatively, the package 107 may be combined with one or more other packages to be shipped in a larger package, in which case the label 111 may be included in the larger package as a part of a package contents list.

If all goes according to plan, all received orders 101 are fulfilled and packaged by the system without a flaw. However, as is sometimes the case, one or more received packages 107 may get lost within the system and not get properly processed. There may be many causes for this, such as loss, destruction, or misplacement of the product(s), package(s), or position identifier during the transport through the automated packaging system. The end result may be that one or more expected packages 107 are missing at the output of the automated packaging system 130, and/or that the expected numbers of filled packages 107 are present, but one or more of the packages 107 output by the automated packaging system 130 is unidentified.

Due to the use of both a sequence 105 (which dictates the order of succession for processing the product groups 103, and which is identified by a sequence identifier), and a position identifier (a different one of which is associated with each product group 103 in a given set of product groups (referred to hereinafter as a "gang") and which identifies the sequential position of the product group 103 within its particular gang), embodiments of the invention allow for both identification of unidentified packages 107, and for automated re-submission of a product group 103 associated with an expected but missing package 107 into the fulfillment system to generate a nearly-lossless fulfillment and automated packaging system requiring very little or no operator intervention.

The system accounts for and provides a solution, where necessary, for the following case scenarios, which are illustrated in FIGS. 2A through 2D, respectively:

Case 1:

Assumptions: N product groups A, B, C, D, E are sequenced into a sequence 202 of N ordered positions, herein called a "gang". The automated packaging system 130 accurately distinguishes between different gangs. The N product groups 130 are sequenced into the automated packaging system 130 in order of succession as defined by the sequence 202 of the associated gang. The automated packaging system 130 is configured such that product groups 103 cannot switch places once under the control of the automated packaging system 130.

Symptoms: As illustrated in FIG. 2A, N packages 107 are output by the automated packaging system 130 and N position identifiers (or expected gang identifiers) are successfully read.

Results: N packages 107 have been successfully fulfilled and packaged. Each package 107 can be accurately associated with its corresponding order 101. No solution necessary.

Case 2:

Assumptions: N product groups A, B, C, D, E are sequenced into a gang 202 of N ordered positions. The automated packaging system 130 accurately distinguishes between different gangs. The N product groups 130 are sequenced into the automated packaging system 130 in order of succession as defined by the sequence 202 of the associated gang. The automated packaging system 130 is configured such that product groups 103 cannot switch places once under the control of the automated packaging system 130.

Symptoms: As illustrated in FIG. 2B, N packages 107 are output by the automated packaging system 130 but fewer than N position identifiers (or expected gang identifiers) are successfully read.

Results: N packages 107 have been successfully fulfilled but one or more of the packages 107 is not identified and therefore is not associated by the system with its order.

Solution: The unidentified packages are identified by inferring the position identifier of the unidentified package(s) based on the absolute position of the respective unidentified package(s) relative to the absolute position(s) of the other identified package(s).

Example: Suppose five product groups A, B, C, D, E are grouped into a gang imposing the following sequence (position:product group): 1:A, 2:B, 3:C, 4:D, 5:E. The sequence thus has 5 positions (1, 2, 3, 4, 5 ), whereby product group A is associated with position 1, product group B is associated with position 2, product group C is associated with position 3, product group D is associated with position 4, and product group E is associated with position 5. Next suppose that 5 packages come out of the automated packaging system, and position identifiers 1, 2, and 5 are successfully read. That is, the sequence of the packages coming out of the automated packaging system is 1, 2, X, Y, 5, where X and Y each represent an unknown position identifier. However, because the product groups A, B, C, D, E are sequenced into the automated packaging system in order of succession as defined by their associated sequence 202, and because all packages are present, the automated packaging system is able to infer that the unidentified package output by the system at position X maps (relative to the absolute position(s) of the other packages sequencing through the automated packaging system 130) to position 3 in the sequence 202, and the unidentified package output by the system at position Y maps to position 4 in the sequence 202. In other words, the sequential position of each package coming out of the automated packaging system 130 maps directly to its sequential position in its corresponding sequence/gang 202. Accordingly, if the same number of packages 107 exit the automated packaging system 130 as go into the automated packaging system 130 for a given gang, the position identifiers of any unidentified package is inferred by the system based on its absolute position relative to the absolute positions of the other packages conveyed through the system.

Case 3:

Assumptions: N product groups A, B, C, D, E are sequenced into a gang 202 of N ordered positions. The automated packaging system 130 accurately distinguishes between different gangs. The N product groups 130 are sequenced into the automated packaging system 130 in order of succession as defined by the sequence 202 of the associated gang. The automated packaging system 130 is configured such that product groups 103 cannot switch places once under the control of the automated packaging system 130.

Symptoms: As illustrated in FIG. 2C, fewer than N boxes are output by the automated packaging system 130 but each of the position identifiers from the successfully output package(s) is successfully read.

Results: Fewer than N packages have been successfully fulfilled but all of the existing packages 107 have been identified and associated with the correct order. One or more packages are missing.

Solution: The position identifier(s) of the missing package(s) 107 can be identified through inference given the sequence imposed by the gang 202 and the position identifiers of the successfully read packages 107. Once a position identifier associated with a missing package 107 is inferred, the product group associated with the inferred position identifier can be identified and automatically resubmitted to the fulfillment system 110 to ensure that the product group associated with the missing package 107 is fulfilled.

Example: Suppose five product groups A, B, C, D, E are grouped into a gang imposing the following sequence (position:product group): 1:A, 2:B, 3:C, 4:D, 5:E. The sequence thus has 5 positions (1, 2, 3, 4, 5), whereby product group A is associated with position 1, product group B is associated with position 2, product group C is associated with position 3, product group D is associated with position 4, and product group E is associated with position 5. Next suppose that three packages come out of the automated packaging system 130, and that position identifiers 1, 2, and 5 are successfully read. Because the orders are sequenced into the automated packaging system 130 in order of succession (position 1, position 2, position 3, position 4, position 5), and because packages 107 having position identifiers associated with only position 1, position 2, and position 5 are present and successfully read, the system is able to infer that the missing packages 107 should have been at positions 3 and 4 in the sequence 202. The position identifiers associated with positions 3 and 4 are thus inferred to be associated with the missing packages 107. The product groups C and D associated with the inferred missing position identifiers 3 and 4 can then be resubmitted to the fulfillment system 110 automatically and without user intervention to be reprocessed and fulfilled.

Case 4:

Assumptions: N product groups A, B, C, D, E are sequenced into a gang 202 of N ordered positions. The automated packaging system 130 accurately distinguishes between different gangs. The N product groups 130 are sequenced into the automated packaging system 130 in order of succession as defined by the sequence 202 of the associated gang. The automated packaging system 130 is configured such that product groups 103 cannot switch places once under the control of the automated packaging system 130.

Symptoms: As illustrated in FIG. 2D, fewer than N boxes are output by the autoboxing system and not all of the position identifiers from the successfully output box(es) are successfully read.

Results: Fewer than N product groups have been successfully fulfilled resulting in fewer than N packages 107 output by the automated packaging system 130 and not all of the packages 107 are successfully identified.

Solution: The missing position identifier(s) can be identified through inference given the sequence 202 and the position identifiers of the successfully read position identifiers.

Example: Suppose five product groups A, B, C, D, E are grouped into a gang imposing the following sequence (position:product group): 1:A, 2:B, 3:C, 4:D, 5:E. The sequence thus has 5 positions (1, 2, 3, 4, 5), whereby product group A is associated with position 1, product group B is associated with position 2, product group C is associated with position 3, product group D is associated with position 4, and product group E is associated with position 5. Next suppose that four packages 107 come out of the automated packaging system 130, and position identifiers 1, 2, and 5 are successfully read. Because the product groups A, B, C, D, E are sequenced into the automated packaging system 130 in order of succession (position 1, position 2, position 3, position 4, position 5), and because packages 107 having position identifiers associated with only position 1, position 2, and position 5 are present and successfully read, the system is able to infer that the unidentified package should be associated with one of either position 3 or 4 in the sequence, and that a missing package is associated with the other position. The system thus infers that the position identifier associated with the unidentified package is associated with one of either position 3 or 4, and the system can signal the labeling system 496 to generate a special label or other indication to the automated packaging system 130 to divert the unidentified package to an operator for visual comparison of the contents of the package with the orders associated with positions 3 and 4. Once the operator identifies which product group and associated order the unidentified package is associated with, a label can be created for that box and it can be shipped without having to discard it and resubmit the order to the system, which clearly cuts down on waste and system resources. Furthermore, once the unidentified package is identified and associated with its product group and order, the system then knows the position identifier(s) of any remaining missing package(s), enabling the system itself to automatically resubmit the product groups associated with those position identifier(s) to the fulfillment system 110 and to free the operator from having to resubmit the orders manually.

Figure 3:
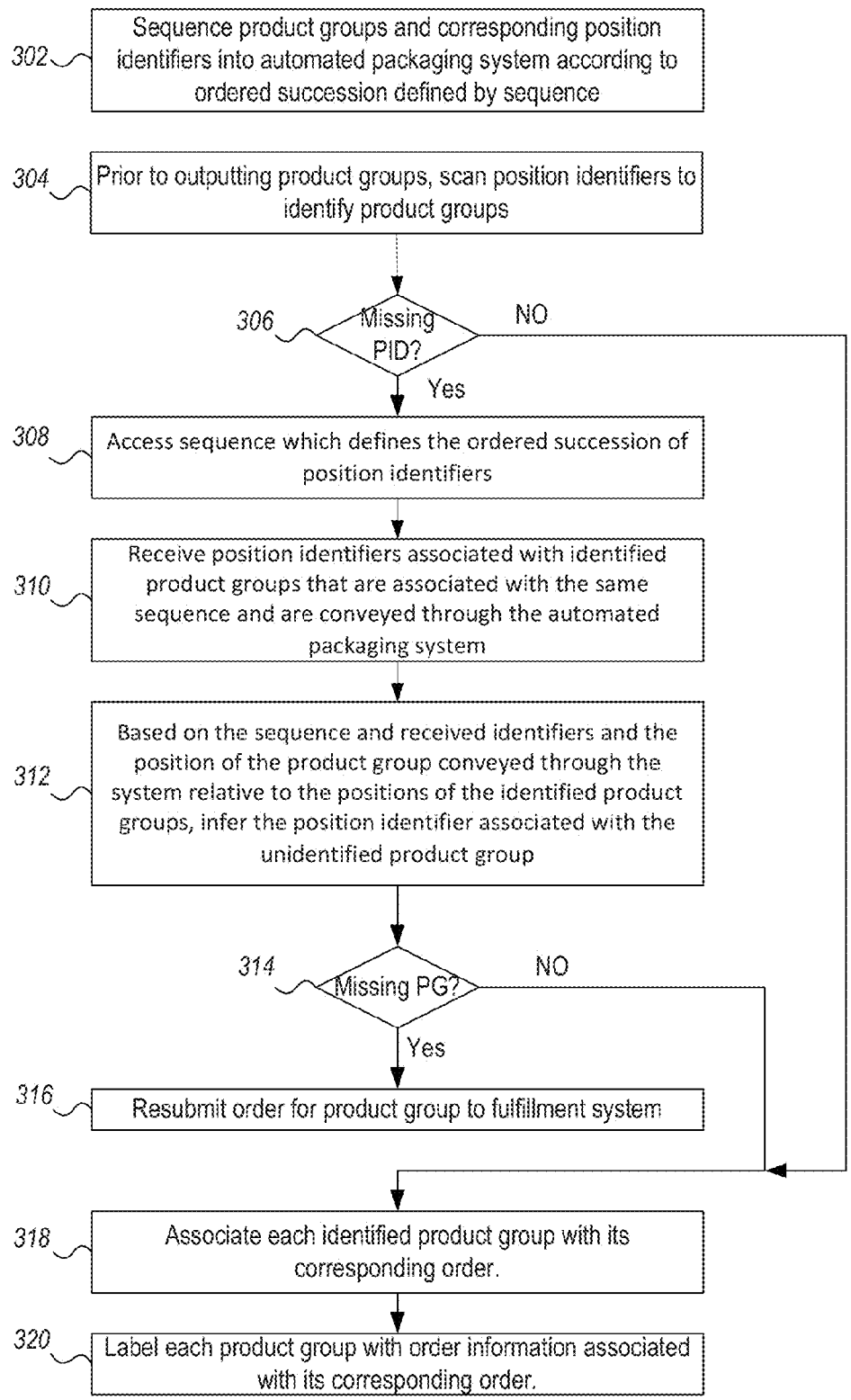
FIG. 3 is an operational flowchart illustrating an exemplary embodiment for inferring identifiers for unidentified product groups.

FIG. 3 is a flowchart of an inference process that may be automatically executed by the automated packaging system or other controller. As illustrated, product groups and their accompanying corresponding position identifiers are sequenced into the automated packaging system in ordered succession as defined according to their associated sequence 202 (step 302). Prior to outputting the product groups, the position identifiers of each product group are scanned to identify the product groups inside the automated packaging system (step 304). The position identifiers are reviewed by a controller to determine if any of the expected position identifiers are missing. If no position identifiers are found by the controller to be missing (as determined in step 306), each identified product group is associated with its corresponding order (step 318) and a label is generated containing order information associated with its corresponding order (step 320) to be affixed to the package containing the identified product group.

If, however, the controller determines that one or more of the expected position identifiers are missing (step 306), then the controller accesses the sequence which defines the ordered succession of conveyance of the expected position identifiers (step 308), and receives the actual detected position identifiers that accompanied the product groups through the automated packaging system (step 310), and infers the position identifier associated with the unidentified product group based on the absolute positions of the products conveyed in the automated packaging system and their corresponding positions in the ordered succession defined by the sequence (step 312).

The controller then determines whether the actual product group itself is missing (step 314). If not, the controller associates the product group with its order based on the inferred position identifier (step 318), and a label is generated containing information associating the package with its corresponding order (step 320).

If, however the actual product group itself is missing (as determined in step 314), the order for the product group associated with the inferred position identifier is submitted to the fulfillment system automatically by the controller (step 316).

From the above description, it is clear that the described embodiments of the invention facilitate a near operator-free order-tracking, fulfillment, and automated packaging system such that once an order is received into the fulfillment center, it is processed autonomously by the fulfillment system 110 and automated packaging system 130 (generally without operator assistance—all except Case 4 described above) until it fulfilled, packaged, and output by the system. The system can therefore be viewed as essentially a lossless production line.

As explained above, one assumption of the lossless production line is the ability of the automated packaging system 130 to detect at least the beginning (and preferably the end) of each set of packages associated with the same gang. Means for implementing such recognition by the automated packaging system will depend on the particular application and configuration of the system.

Figure 4:
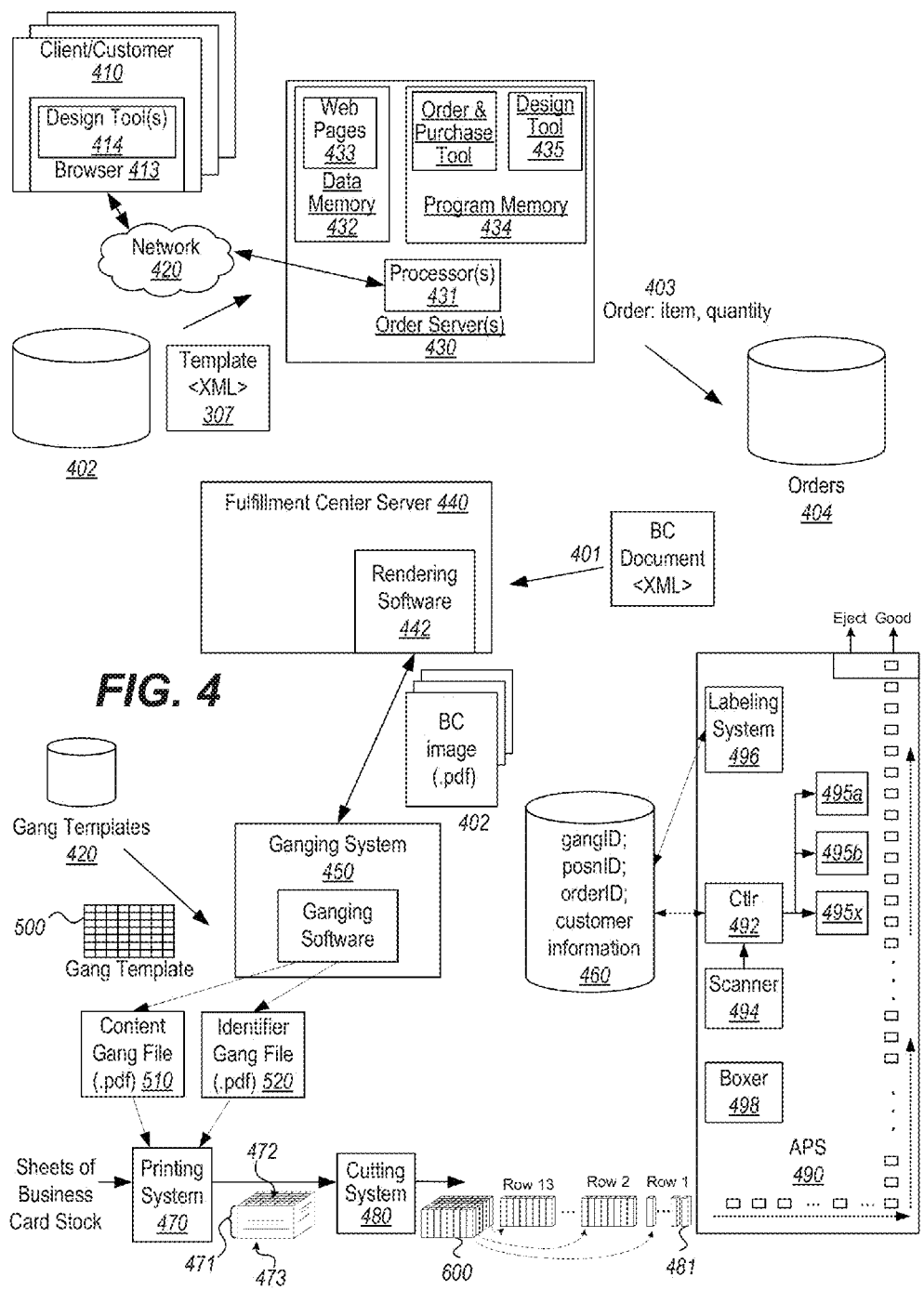
FIG. 4 is a block diagram of an online business card retailer implementing aspects of the invention.

FIG. 4 is a block diagram of an online business card retail system 400 whose fulfillment center includes a business card autoboxing system 460 that takes stacks of printed business cards and automatically boxes each stack and labels each box with information associated with its corresponding order. For example, an order server 430 may receive multiple different orders from multiple different customers 410, each order specifying unique or customized information to be imprinted on the ordered business cards of specified quantity. Thus, the order information associated with the various stacks of business cards presented to the autoboxing system will typically be different from one stack to the next.

In order to ensure that each boxed stack of business cards exiting from the autoboxing system 460 is properly labeled with information (such as the customer name and address) associated with the boxes' associated order, groups of business card stacks are first assigned to a group (hereinafter referred to as a "gang") of business card stacks. As described in more detail shortly, each gang has a number of defined sequentially ordered positions. Each business card stack is assigned to both (1) a gang, and (2) a specific position within the gang. Each gang is associated with a gang identifier that is different from other gangs to be processed. Each position in a gang is associated with a position identifier that is different from other position identifiers associated with the same gang. Each business card stack is therefore associated with a gang identifier and a position identifier. Each business card stack is also associated with a customer order. Each customer order has associated customer information that allows the business card stack to be associated with the customer.

The autoboxing system 460 utilizes gang identifiers and position identifiers to identify boxes of business cards exiting the boxer mechanism so that they can be associated with their correct order and the box can be appropriately labeled for shipment and further order tracking. In an embodiment, the corresponding gang identifier and/or corresponding position identifier is printed on a top sheet of each business card stack going into the autoboxing system. Again, each business card stack is submitted to the autoboxing system in order of succession as defined by its respective position in its associated gang.

The top sheet can be a separate piece of paper placed on top of the stack of business cards, or can be imprinted directly onto the top business card in the stack. In one embodiment, both the sequence identifier and the position identifier are printed on the top sheet of each stack. In an alternative embodiment, the sequence identifier is printed in place of at least one position identifier on one or more (but not all) of the top sheets of each stack. This may be useful to avoid confusion between identifiers, for example, when the system uses a single barcode reader that looks for a single barcode. In another embodiment, the sequence identifier alone is printed on the top sheet of each stack, wherein the position identifier of each stack is derived from its physical position in the autoboxing system (for example, an autoboxing machine may have physical compartments whose position is relative to all the other physical compartments in the machine are fixed and therefore known. There are many other variations for embodiments that allow the autoboxing system to distinguish one group of business card stacks belonging to one particular defined sequence from another group of business card stacks belonging to a different defined sequence. The claimed invention contemplates the use of these other embodiments so long as the automated packaging system can definitively determine that a particular business card stack is associated with a particular defined sequence.

In an embodiment, the business card stacks are arranged in a defined sequence called a gang, with each stack having a top sheet imprinted with a gang identifier and/or a position identifier. The business card stacks are submitted to the autoboxing system. The autoboxing system boxes the stacks of business card in sequence. Prior to closing the top of the box, the opened filled box is passed by a gang/position identifier reader 494, which reads the gang identifier and/or position identifier associated with the business card stack, and passes the identifier information on to a controller 492. In an embodiment, the gang identifier and position identifier are implemented as barcodes, and the reader 494 is a barcode reader.

The controller 492 uses the gang identifier and position identifier to look up the order associated with the business card stack from a database 460. Again, because each business card stack is associated with both a customer order (either directly, or indirectly via additional links as by product group) and with a gang identifier and position identifier, the box containing the business card stack can be easily identified as being associated with a particular customer order.

The controller 492 effects extraction of customer information to be submitted to a labeling system 496. The labeling system 496 generates a label containing information associating the box with a customer order. The label is then affixed to the box or travels with the box for other use. While not limiting for purposes of this invention, typical customer information will be a customer name and shipping address, and/or a barcode from which such information can be derived.

Turning now in more detail to a specific implementation of the online business card retail system 400 of FIG. 4, in implementation, the system 400 includes an order server 430 connected over a network 420 (such as the Internet) to any number of customers operating client computers 410. Order server 430 is one or more computer system(s) having one or more processor(s) 431, computer readable data memory 432, and computer readable program memory 434. Customers may access a website comprising a number of web pages 433 that is hosted by the order server 430 or by an intervening server (not shown) to view business card templates and to select, design, and/or customize various design components of a selected business card template prior to ordering. For example, multiple business card templates may be selectable by the customer, via one or more web pages 433, for further customization such as adding customer-personalized information such as name, business name, address, phone number, website URL, taglines, images, etc.

Design tool(s) 414, 435 software may be provided and may execute directly on the server 430, or may be downloaded from the server 430 as part of web pages 433 displayed to the user to run in the customer's browser 413 on the customer's computer 410. In an embodiment, the design tool(s) 414, 435 enable the user to perform simple design functions by completing a selected template using a Design Wizard, or more complex design functions using a Design Studio, locally in the browser. In an embodiment, the templates are embodied using an XML format or other appropriate format.

When a customer is satisfied with their selections and/or customizations, the customer can place an order through the server 430. In the illustrated embodiment of FIG. 4, the customized product design template is referred to as a business card document 401. A business card document 401 is a document description of the customized business card design template, and in one embodiment is stored in an XML format. Placement of an order for a specific quantity of a specific business card design results in a collection of information associated with the order. The collection of information is referred to herein as an order object 403. The customer's business card document 401 is sent to a Fulfillment Center server 440. In an embodiment, the business card document 401 is sent to the Fulfillment Center server 440 in XML format, and the XML file is then converted by rendering software 441 at the server 440 into a set of associated print-ready files such as an Adobe®.pdf or other such PostScript file. Orders 403 are stored in an order database 404.

A server 440 at a fulfillment center may retrieve orders 403 from the order database 404, generate a print-ready image of a business card specified in the retrieved order 403. In one embodiment, the Fulfillment Center includes one or more computer system(s) having one or more processors that execute program instructions for rendering software 442, ganging system software 450, and automated packaging system control 492.

Rendering software 442 converts business card documents 401 from the web format (e.g., <XML> or Document Object Model (DOM) descriptions) used in the customer's web browser 413 for displaying the web view of the design as seen by the customer during the design process to an associated set of print-ready (i.e., manufacturable) business card image files 402 such as a Postscript (e.g., .pdf) file ready to print by a printing press or other printing system.

A ganging system 450, which may be software executing on the server system 440 or may be executed by one or more processors in one or more different computer systems, may, based on factors beyond the scope of the present invention (such as quantity ordered and required shipping times), assign the business card image files 402 to a gang and a specific ordered position in the gang. The gang is associated with a gang identifier and the position in the gang is associated with a position identifier.

In operation, the ganging system 450 may retrieve a gang template 500 (FIG. 5A) having a predetermined layout with a predetermined number of empty cells 501 (or "cells") at predetermined positions into which print-ready business card images may be inserted. For example, FIG. 5A illustrates an example gang template 500 having a grid layout of cells 501 arranged in 13 rows and 11 columns. As mentioned, the cells 501 of a gang template 500 are initially empty of content to be printed. Each cell 501 may be identified by a unique position identifier (1, 2, 3, . . . , 143) in the gang template 500. In the illustrated embodiment, the position identifiers 1, 2, 3, . . . , 143 map directly to the sequential position of the cell in the sequence defined by the gang template 500. The gang template 500 is merely an empty layout container that defines the sequence and positions of the cells 501.

The ganging system 450 selects a gang template 500, opens the selected gang template 500 to create a new content gang file 510, assigns a gang identifier 515 to the new content gang file 510, and then inserts at most one print-ready business card image 402 into any given empty cell 511 in the content gang file 510. Each cell 501 in the gang template 500 (FIG. 5A) is associated with a position in the sequence imposed by the gang template 500. The structure and positional sequence imposed by the gang template 500 carries through to the content gang file 510 created from the template 500. Thus, when a business card image $402_1, 402_2, \ldots, 402_{143}$ is inserted into an empty cell 511 in a content gang file 510, the business card image $402_1, 402_2, \ldots, 402_{143}$ is associated with a position identifier $516_1, 516_2, \ldots, 516_{143}$ that indicates that the specified business card image $402_1, 402_2, \ldots, 402_{143}$ is sequenced at the position corresponding to the position of the cell 511 it occupies in the content gang file 510. Both the gang identifier 515 and the position identifier $516_1, 516_2, \ldots, 516_{143}$ are then associated (by way of a link such as via one or more relational database table(s) 460 or other linking mechanism) with the business card order 403 associated with the business card image $402_1, 402_2, \ldots, 402_{143}$. Links may be in the form of computer readable relational database tables or objects stored in computer readable memory.

In one embodiment, when the ganging system 450 creates a new content gang, the ganging system 450 simultaneously creates or otherwise obtains an identifier gang file 520 and associates the identifier gang file 520 with the content gang file 510. The identifier gang file 520 is created from the same gang template 500 as the content gang file 510 was created from, and therefore the structure and positional sequencing imposed by the template 500 is carried through to the identifier gang file 520. In one embodiment, a print-ready version of a position identifier 516 is inserted into all cells 521 except the corner cells, wherein only a print-ready version of the gang identifier 515 is inserted in each of the four corner cells. In other embodiments, a print-ready version of the gang identifier 515 and the position identifier 516 identifying the position of the particular cell in the gang template are inserted into each cell 521 in the identifier gang file 520. Alternative combinations and/or configurations of the insertion of the gang identifier 515 and position identifiers 516 may be implemented. In one embodiment, the gang identifier 515 and the position identifiers 516 are each implemented as barcodes. All instances of a gang identifier 515 in the identifier gang file 520 are identical—that is, they each identify the same gang, namely, the gang represented by the content gang file 510. All instances of a position identifier $516_1, 516_2, \ldots, 516_{143}$ are unique across any given identifier gang file 520—that is, no two cells 521 contain the same position identifier.

The fulfillment center server 440 and ganging system 450 will continue to retrieve additional orders 403 and insert associated business card images $402_1, 402_2, \ldots, 402_{143}$ into respective empty cells 511 of the content gang file 510 until all cells 511 in the content gang file 510 are filled or until some other condition is met (for example, a time limit is reached, etc.). When a content gang file 510 is closed and saved, it is submitted to a printing system 470, which prints the content gang file 510 (which contains the aggregated images of business cards associated with a plurality of different orders) onto a specified quantity of sheets of business card stock. The identifier gang file 520 associated with the content gang file 510 is also printed onto a top sheet 472, which is placed on top of the stack of printed content gang sheets 471 to form a completed gang sheet stack 473. A completed gang sheet stack comprises one or more content gang sheets $471_a, 471_b, \ldots, 417_n$ topped by an identifier gang sheet 472.

The completed gang sheet stack 473 is then submitted to a cutting system 480 which simultaneously separates all sheets in the stack 473 into individual stacks 481 of business cards. The cutter may utilize laser or blade technology. Because each content gang sheet 471 in the stack 473 of gang sheets is identical, each business card in each respective stack $481_1, 481_2, \ldots, 481_{143}$ of business cards is also identical. Because the layout of the identifier gang sheet 472 is based on the same gang template 500 as the content gang sheets $471_a, 471_b, \ldots, 417_n$, each business card stack $481_1, 481_2, \ldots, 481_{143}$ is topped with a card or paper having a positional identifier $516_1, 516_2, \ldots, 516_{143}$ identifying its position in the gang. At least one top card or sheet among the stacks 481 of business cards includes the gang identifier associated with this particular gang. In one embodiment, the top card or sheet of the stacks $481_1, 481_{12}, 481_{133}, 481_{143}$ includes the gang identifier 515. It is to be understood, however, that the gang identifier 515 may be printed on any or all top cards.

Figure 6A:
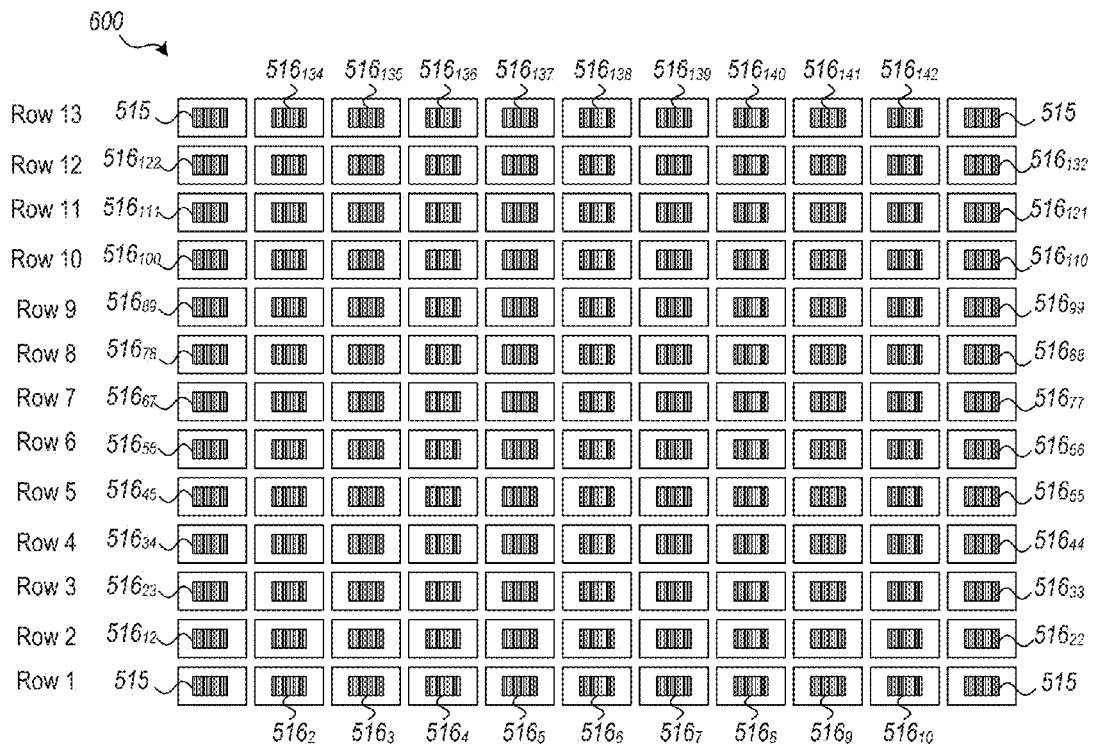
FIGS. 6A-6B depicts a grid of business card stacks prior to submission to an automated packaging system.

For example, FIG. 6A shows a top-down view of a grid 600 of stacks 481 of business cards output by the cutting system 480 that were created from the example gang files (content and identifier gang files 510 and 520) shown in FIGS. 5B and 5C. Each stack 481 occupies a different position in the grid 600. For example, the first row of the grid 600 includes stacks $481_1, \ldots, 481_{11}$ at positions 1 through 11; the second row of the grid 600 includes stacks $481_{12}, \ldots, 481_{22}$ at positions 12 through 22, and so on, such that the last row of the grid 600 includes stacks $481_{133}, \ldots, 481_{143}$ at positions 133 through 143. In order to identify which position in the grid 600 a particular stack occupies for later matching up the boxed stack with its order, the top sheet of each of the stacks 481 includes an identifier such as a barcode identifying the position (or in the case of the four corners, the gang). In one embodiment, the barcode corresponds to the gang identifier for stacks at each of the four corners of the grid, or to the position identifiers for all other stacks in the grid 600.

Returning to FIG. 4, the autoboxing system 490 receives the stacks 481 of business cards corresponding to a single row of the grid 600 at a time—that is, row 1 of the grid 600 is submitted to the autoboxing system first, row 2 of the grid 600 is submitted to the autoboxing system next, and so on through row 13, at which time the entire set of stacks of business cards associated with the same gang identifier 515 are processed by the autoboxing system 490.

The autoboxing system 490 includes a boxer which boxes each stack 481. The autoboxing system 490 includes an identifier reader 494 which is configured to attempt to read the identifier on the top card/sheet of each boxed stack, and sends the identifier information (including, if no position identifier is successfully read, a signal indicating the same) to the controller 492.

The controller 492 associates the box with the appropriate order based on the identified position identifier. When a position identifier is not successfully read by the reader 494, the controller 492 performs an inference algorithm to attempt to infer, where possible, the position identifier of unidentified or missing boxes. When an unidentified box cannot be identified through inference, the controller 492 flags the box and possible orders to which it may be associated, to be visually reviewed by an operator. In one embodiment, the flag is entered on a label, which is automatically detected and ejected by the autoboxing system for operator review.

When a position identifier cannot be successfully read because the box is simply missing, the controller attempts to infer the position identifier of the missing box. If successful, the controller 492 associates the missing position identifier with the product group and its associated order, and automatically re-submits the product group to the ganging system 450 for re-fulfillment.

Figure 6B:
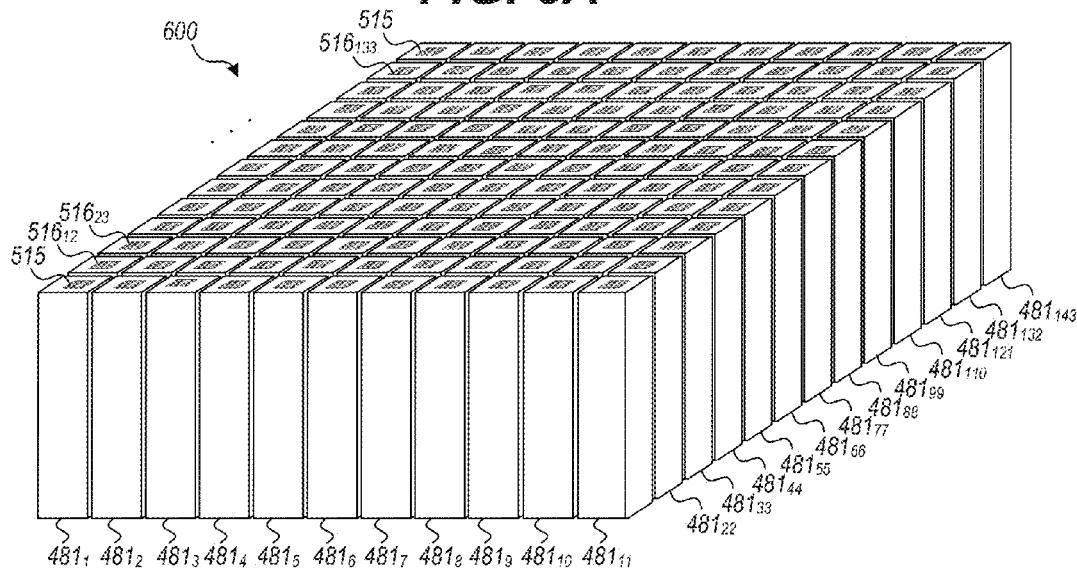
Figure 7:
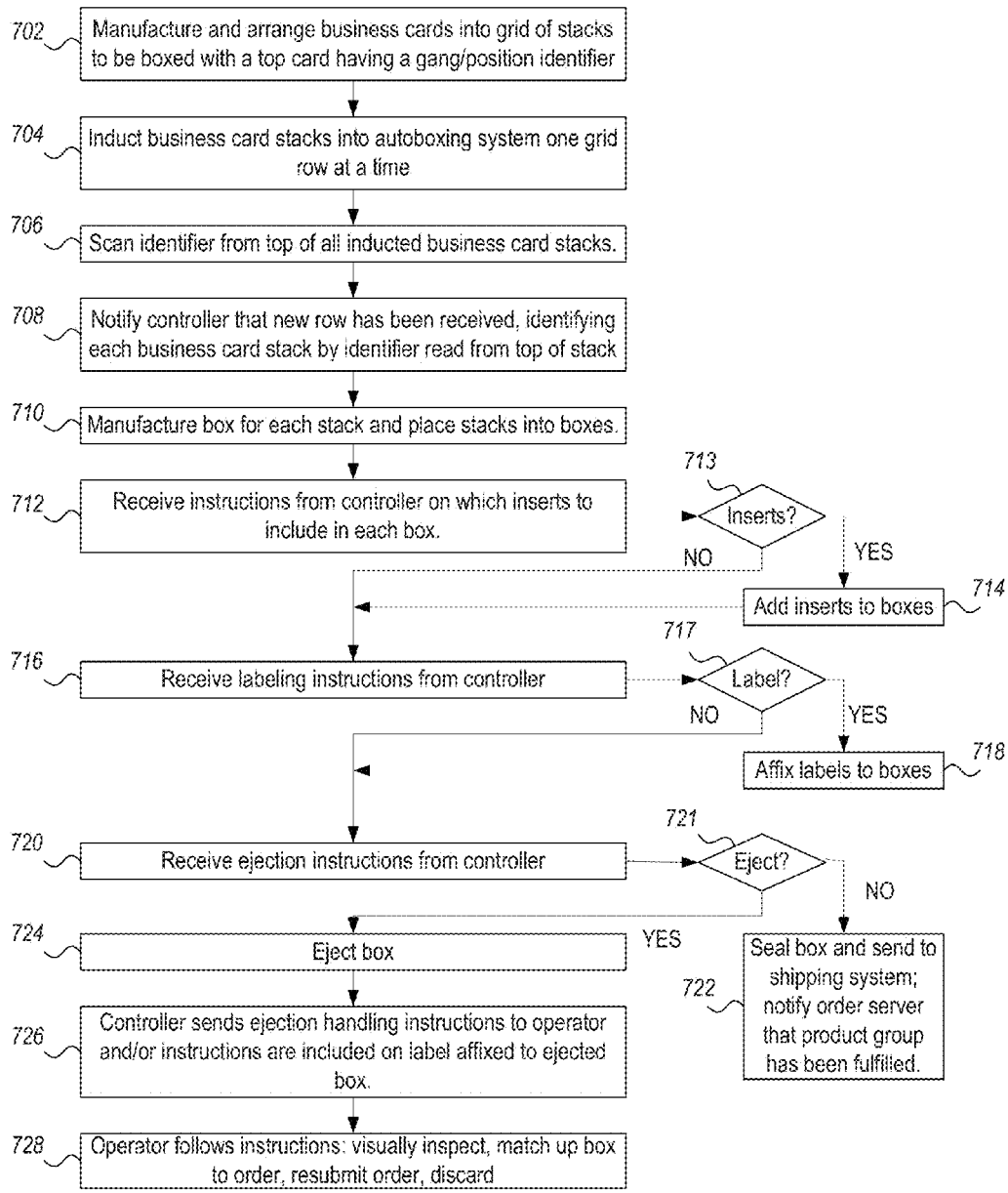
FIG. 7 is a flowchart describing an exemplary process flow followed by product through the autoboxing system 490.

FIG. 7 is a flowchart describing an exemplary process flow followed by product through the autoboxing system 490. The process begins with the manufacture and arrangement of business cards into a grid 600 of stacks 481 of business cards to be boxed, wherein each top card/sheet of each stack 481 should include either a gang identifier 515 or position identifier 516 (step 702). Row by row, business card stacks 481 are inducted into the autoboxing system 490. In an embodiment, the autoboxing system 490 comprises n pickers, each picker for robotically picking up one business card stack and inducting it into the system. Thus, in a preferred embodiment, each row of the grid 600 comprises n business card stacks (wherein n=11 in the illustrative embodiment of FIGS. 6A and 6B, and n pickers simultaneously induct 11 business card stacks (corresponding to one row of the grid) into the autoboxing system.

The autoboxing system 490 scans the topsheet barcodes of all business card stacks in the row (step 706). Between the time that the top sheet is placed on top of each business card stack and the point at which the barcode scanner scans the top of each stack within the system 490, one or more top sheets may become displaced from the top of its corresponding stack. For example, in an industrial environment, there is often airflow sufficient to blow one or more of the top sheets off of its corresponding stack. Thus, at the point when the autoboxing system 490 scans the tops of the stacks, one or more top sheets may be missing from the stacks and the stacks will be unidentified. Furthermore, one or more stacks may be entirely missing, and therefore the position identifier associated with the missing stack will also not be detected by the barcode reader.

Once the identifiers scanned from the tops of the business card stacks are read, the barcode information is sent to a controller, thereby notifying the controller that the row has been inducted into the system and which business card stacks have identifying position identifiers (step 708).

The autoboxing system 490 manufacturers a box for each stack and places each stack into a box (step 710).

The autoboxing system 490 receives instructions from the controller on which of a plurality of inserts to include in each of the boxes (step 712). For each box, if one or more inserts are to be inserted (step 713), the corresponding insert(s) are inserted into the box (step 714).

The autoboxing system 490 also receives instructions from the controller about how to label each box (step 716). Given the scanned barcodes, the controller looks up the product groups and associated orders associated with the identified position identifiers. For any of the n stacks where the barcode is a gang identifier or where the barcode is missing, or where the stack itself is missing, the controller attempts to infer the respective position identifier using the techniques previously discussed. If the controller is able to infer the position identifier for any of these stacks, the controller looks up the product group associated with the position identifier and associates the stack with the product group and its corresponding order. If the stack is present and identified, customer information associated with its order is obtained and sent to the labeling system for creation and affixation of a label onto the box. If the stack is present and remains unidentified even after the inference algorithm is performed, instructions for the operator to perform a visual inspection of the contents of the box and information about possible orders it could be are sent to the labeling system for creation and affixation of such a label to the unidentified box. If the stack is not present (i.e., is now missing) but identified through inference, the product group associated with the missing stack is resubmitted to the fulfillment system. A label may be generated for a box that is supposed to contain a missing stack, wherein the instructions on the label may indicate that the box should be ejected and discarded. If labeling instructions are received for a given box (step 717), the labeling system generates a label and affixes it to the box (step 718).

The autoboxing system 490 also receives instructions from the controller regarding whether a box should or should not be ejected from the system (step 720). If a box is not to be ejected (as determined in step 721), the box is then sealed and sent to the next processing step (such as sending the box to the shipping system). The order server is notified that the product group associated with the boxed business card stack has been fulfilled (step 722).

Various reasons for ejecting a box from the system include quality assurance (to provide operators with the opportunity to examine specific boxes), cancellation of an order, detection of a problem with the business card stack, if the business card stack requires un-branded packaging, if the business card stack corresponds to an empty cell in the gang, and/or if the position identifier associated with the stack cannot be definitively determined through inference and must be submitted to a visual inspection. If the instructions associated with a box are to eject the box (step 721), the box is ejected from the autoboxing system (step 724), and the controller sends ejection handling instructions to one or both of the labeling system (for imprinting onto the label to be affixed to the box) and the operator workstation (step 726). When sent to an operator, the operator follows the instructions associated with the box (step 728), which may include one or more of: visually inspect, compare contents to one or more content images associated with respective different orders, resubmit order, discard.

As mentioned above, the autoboxing system will sometimes eject boxes to an inspection station. In an embodiment, instructions are sent to an operator display screen, where an operator inspects all ejected boxes. In an embodiment, the operator may receive the following choices as they scan each ejected box:

If the box was ejected because it was cancelled or has since been re-printed, the operator is instructed to discard the box If the box is identified through the box scan the operator is instructed to visually inspect the box and move it to the next station If the box cannot be identified (e.g. unreadable barcode, unexpected barcode) the operator will be asked to visually identify the box using screen shots of known missing boxes (i.e. boxes fed to the autoboxing system that have not been reported as having proceeded to the next step in the flow)

If the operator cannot identify the box, the operator is instructed to discard it Once the operator has processed all ejected boxes, the system may end up with a list of boxes that are missing (either because the system lost track of them, or because they were damaged or destroyed in the process). The list of missing boxes is processed automatically by the fulfillment system server to reprocess the orders corresponding to the missing boxes. Alternatively, the operator may manually resubmit these orders.

Figure 8:
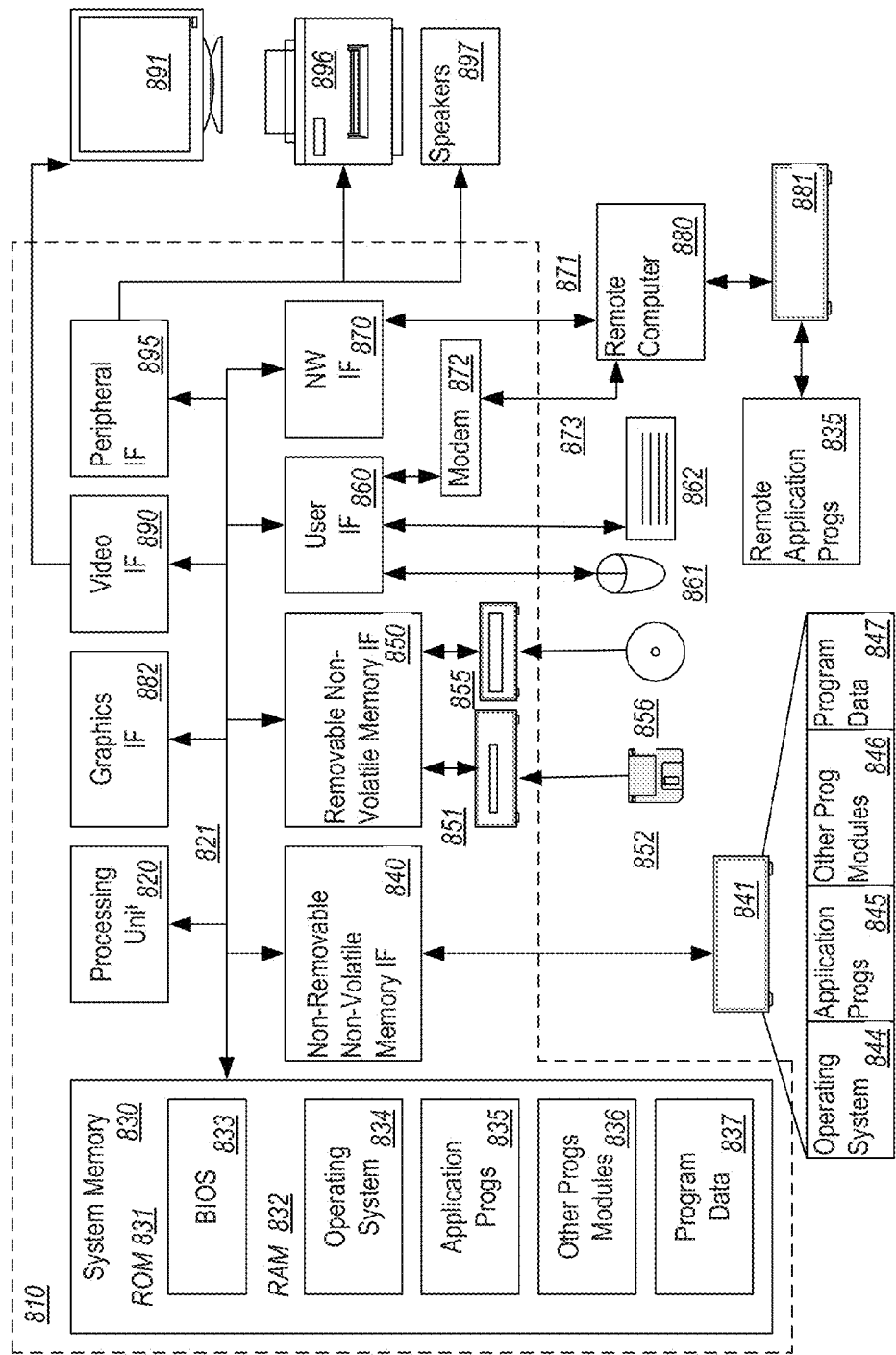
FIG. 8 is a block diagram of a computer system which may be used to implement computing features of the invention.

FIG. 8 illustrates a computer system 810 that may be used to implement any of the servers and computer systems discussed herein. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 810. Computer storage media typically embodies computer readable instructions, data structures, program modules or other data.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable, volatile/nonvolatile computer storage media. By way of example only, FIG. 8 illustrates a hard disk drive 840 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8 provide storage of computer readable instructions, data structures, program modules and other data for the computer 810. In FIG. 8, for example, hard disk drive 841 is illustrated as storing operating system 1044, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 890.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

Those of skill in the art will appreciate that the invented methods and systems described and illustrated herein may be implemented in software, firmware or hardware, or any suitable combination thereof. Thus, those of skill in the art will appreciate that the methods and systems described herein may be implemented by one or more processors executing computer-readable instructions being stored for execution on one or more computer-readable media. Alternative embodiments are contemplated, however, and are within the spirit and scope of the invention.

Although this preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A method of tracking product groups through an automated processing system, comprising:
    sequencing a plurality of product groups, each with a corresponding accompanying physical position identifier, into the automated processing system according to a predefined ordered sequence;
    processing the plurality of product groups by the automated processing system;
    prior to outputting the plurality of product groups from the automated processing system:
    scanning the position identifiers of the plurality of product groups sequenced into the system,
    reviewing the scanned position identifiers to determine, based on the predefined order sequence and expected position identifiers of the sequenced plurality of product groups, if any of the sequenced position identifiers are missing,
    if no sequenced position identifiers are determined to be missing, associating each respective product group with its corresponding order,
    if any expected position identifier is determined to be missing, inferring identification of the missing expected position identifier based on the predefined ordered sequence and received expected position identifiers, and associating the inferred position identifier with its corresponding order.

2. The method of claim 1, further comprising:
    if the respective product group associated with the inferred position identifier is present in the expected sequence of processed product groups, associating the inferred position identifier with the respective product group; and
    if the respective product group associated with the inferred position identifier is missing from the expected sequence of processed product groups, resubmitting the order associated with the missing product group to a fulfillment system.

3. A system of tracking product groups through an automated processing system, comprising:
    a sequencer which sequences a plurality of product groups, each with a corresponding accompanying physical position identifier, into the automated processing system according to a predefined ordered sequence;
    a transport system which conveys the sequenced plurality of product groups and accompanying physical position identifiers through the automated processing system;
    one or more scanners which scan the position identifiers of the plurality of product groups prior to exiting the automated processing system;
    one or more processors which review the scanned position identifiers to determine, based on the predefined order sequence and expected position identifiers of the sequenced plurality of product groups, if any of the sequenced position identifiers are missing, the one or more processors configured to associate each respective product group with its corresponding order if no sequenced position identifiers are determined to be missing, and if any expected position identifier is determined to be missing, to infer identification of the missing expected position identifier based on the predefined ordered sequence and received expected position identifiers, and to associate the inferred position identifier with its corresponding order.

4. The system of claim 1, the one or more processors further configured to associate the inferred position identifier with the respective product group if the respective product group associated with the inferred position identifier is present in the expected sequence of processed product groups, and to resubmit the order associated with the missing product group to a fulfillment system if the respective product group associated with the inferred position identifier is missing from the expected sequence of processed product groups.

* * * * *